UNITED STATES PATENT OFFICE 2,477,767

FOOD CASING

Robert K. Remer, Elgin, Ill., assignor to Transparent Package Company, Chicago, Ill., a corporation of Illinois No Drawing. Application August 5, 1948,
Serial No. 42,739

11 Claims. (Cl. 99—176)

The present invention relates, generally, to wrappings, bags, or casings for artificially colored foodstuffs, and it has particular relation to regenerated cellulose sausage casings for skinless wieners and similar meat products.

Both as a matter of convenience and in the light of considerable practical experience, my present invention will be specifically discussed and illustrated in connection with seamless, regenerated cellulose sausage casings of the type used in the production of skinless wieners. However, the invention has considerably broader application, and in fact it is generally useful in the packaging of artificial colored foodstuffs. Accordingly, it will be understood that the present invention is not limited in respect to the specific embodiments described hereinafter, but rather, the purview of the invention is to be determined in accordance with the scope of the appended claims.

An important object of the invention is the provision of a novel method of and means for, artificially coloring foodstuffs, and specifically skinless wieners, which comprises packaging the foodstuff, or stuffing the sausage emulsion, into a wrapping or casing formed from a regenerated cellulose film, and which is uniformly treated with a soluble coloring material adapted uniformly to transfer to the surface of the foodstuff or sausage emulsion upon contact therewith.

Still another important object of the invention is the provision of a method of making regenerated cellulose wrappings or casings for artificially colored food products, and specifically regenerated cellulose sausage casings for skinless wieners, wherein the regenerated cellulose films are, in a single operation, plasticized and uniformly treated with a soluble coloring material adapted upon contact therewith to transfer to the foodstuff or sausage emulsion.

Certain other objects of the invention will, in part, be obvious and will in part appear hereinafter.

Considering the known methods of producing skinless wieners, it is known that such methods conform rather closely to the following process: Sausage emulsion is loaded into a sausage stuffer and extruded under pressure from a stuffing horn into transparent, colorless, regenerated cellulose casings which are supplied to the sausage maker in a shirred condition. As each individual sausage casing is filled or stuffed, it is in turn tied to the end of another stuffed casing and, in this manner a continuous string of the stuffed casings is provided. The string of stuffed casings is drawn through a suitable linking machine and then lengths of the linked sausage are draped or festooned over supporting racks, on which they are carried during the subsequent processing operation.

The racks or frames carrying the linked sausages are placed in a smokehouse, and according to a common method they are smoked at an elevated temperature until cured. After smoking, the sausage, still on the racks or frames, are placed in cookers where, in accordance with a common method, they are sprayed with water at an elevated temperature.

Usually, in these known methods of skinless wiener production, the sausages are colored or dyed during this cooking period. Thus, a suitable dye may be placed in a net bag and lowered into the cooker so as to dissolve in the water. The net bag is removed after the dye is completely dissolved and the water is stirred in order uniformly to disperse the color or dye therethrough. During the cooking period, the dye in the water penetrates the regenerated cellulose casings and colors the surface of the meat therein. Many of the individual sausages may be lying contiguous to one another so that the abutting areas are not reached by the dye, or are at least partially shielded therefrom. Also, many of the individual sausages hang over the supporting sticks thereby preventing the contact areas from being reached by the dye. These areas will evidence themselves in the finished product as light colored strips, customarily referred to in the art as "stick marks."

After the cooking period, the wieners are removed still on the racks or frames, and they are usually sprayed with cold water, drained and then chilled. After the wieners have been sufficiently chilled, the casings may be readily stripped or removed therefrom thereby finishing the production of the skinless wieners. In some instances the regenerated cellulose casings are not removed by the producer, and in these instances, the casings are ordinarily removed by the consumer before eating.

The dyeing operation during cooking or processing is troublesome from several aspects. Thus, great care is required on the part of the operators to insure that the proper amount of dye is uniformly dissolved throughout the cooking water. Even with care, it is difficult to obtain uniform coloring from one batch to another, and considerable waste of expensive coloring material is involved. Also as pointed out above, it is not possible to eliminate all "stick marks" where the sausages hang on the sticks or when they touch each other. Furthermore, certain regulations require the keeping of records covering the type and quantity of dye used.

In accordance with my present invention, sausage casings are provided which, as produced, are treated with a suitable coloring material which will cause the surfaces of the sausage emulsion to be suitably colored without any change in the known methods of production other than to eliminate the present dyeing step during cooking.

In the production of color bearing sausage casings in accordance with the present invention, seamless tubes of regenerated cellulose films may first be made in a known manner as set forth, for example, in United States patents numbered: 1,601,686; 1,937,225; 1,997,349; and 2,013,491. While the casings are still wet, they are then conducted through an aqueous solution of glycerine containing a soluble coloring material compatible therewith such, for example, as a water soluble coal tar dye, thereby both plasticizing and coloring the casings in one operation. After leaving the plasticizing and color treating bath, the casing may be dried in a known manner, as by passage through drying tunnels.

Various modifications may be made in the foregoing method of producing the colored sausage casings of the present invention. Thus, instead of passing the casings through a color treating bath, the coloring material may be applied by spraying, brush coating, or by sponge rolls. The color treatment may be effected in a separate operation instead of being combined with the plasticizing step. Also, colorless, dry sausage casings made by known methods may be treated with soluble coloring material according to one of the methods of application mentioned above.

The glycerine in the above described preferred method of production may be wholly or partially replaced by other plasticizing or modifying agents, such, for example, as the other polyhydric alcohols known to have plasticizing properties. Oil soluble coloring materials, such as FD & C Red #32, FD & C Yellow #3, FD & C Yellow #4, and FD & C Orange #2, can be used. Vegetable oils and emulsions, such as castor oil, soy bean oil, corn oil or peanut oil may be added to the combined plasticizing and color treating bath. However, the preferred plasticizer is glycerine since this material has excellent penetrating properties and appears to serve as a carrier for the coloring material.

Because of pertinent governmental regulations, the soluble coloring materials usually employed include such dyestuffs or coal tar colors as will meet with the approval of the various regulating authorities. Such coloring materials are ordinarily referred to as "certified" colors. For example, the five following coal tar colors, or mixtures thereof, may be suitably used for the present invention:

FD & C Orange I—Monosodium salt of 4-p-sulfophenylazo-1-naphthol.
FD & C Red II (Amaranth)—Tri-sodium salt of 1-(4-sulfo-1-naphthylazo-2 - naphthol-3, 6-disulfonic acid.
FD & C Red I (Ponceau 3R)—Disodium salt of 1-pseudocumylazo-2-naphthol - 3, 6 - disulfonic acid.
FD & C Yellow #5.
FD & C Blue #1.

It will, of course, be understood that the invention is not limited to these particular dyestuffs since there are other coloring materials which may be used which also meet with approval by the governmental regulating agencies involved. For example, such natural coloring matters as alkanet, annatto, carotene, cochineal, green chlorophyl, saffron, and turmeric may be used. Mixtures of two or more coal tar dyes or natural coloring matters may be used, with or without such harmless inert materials as common salt or sugar.

I have obtained very satisfactory results by adding up to ten per cent by weight of one of the above mentioned certified coal tar dyes to a glycerol plasticizing bath which contained from one to thirty per cent by weight of glycerine. After passing through this modified plasticizing bath which, in my process, is also a dyeing bath, the cellulose casings are handled and dried in the usual manner.

My colored cellulose casings after production in accordance with one of the methods mentioned above, may be shirred and packaged for distribution to the sausage makers. These sausage casings are handled by the sausage maker in the same manner as the previous colorless casings. However, as soon as the sausage emulsion is introduced or stuffed into my casings, the coloring material therein immediately transfers to the sausage emulsion so as to give the surface thereof a very uniform, but shallow, coloring. The filled casings are then smoked, cooked, chilled and skinned in known manner except that no additional coloring is required.

It will be apparent that a wide variety of wrappings, bags or casings may be made in accordance with the above disclosure for coloring and wrapping or encasing such foodstuffs as: luncheon meat, Bologna sausages, cheese, etc.

Having fully described my invention and certain preferred embodiment thereof, what I claim as new is:

1. Sausage casing comprising a tube of regenerated cellulose at least substantially completely and uniformly treated with a soluble edible coloring material transferable, on contact therewith, to the surface of sausage emulsion encased therein whereby to uniformly and completely color the surface of said sausage emulsion.

2. Sausage casing comprising a tube of regenerated cellulose at least substantially completely and uniformly treated with at least one edible soluble coal tar dye transferable, on contact therewith, to the surface of sausage emulsion encased therein whereby to uniformly and completely color the surface of said sausage emulsion.

3. Sausage casing comprising a tube of regenerated cellulose at least substantially completely and uniformly treated with at least one soluble edible natural coloring matter transferable, on contact therewith, to the surface of sausage emulsion encased therein whereby to uniformly and completely color the surface of said sausage emulsion.

4. Sausage casing comprising a tube of regenerated cellulose at least substantially completely and uniformly treated with FD & C Orange I transferable, on contact therewith, to the surface of sausage emulsion encased therein whereby to uniformly and completely color the surface of said sausage emulsion.

5. Sausage casing comprising a tube of regenerated cellulose at least substantially completely and uniformly treated with FD & C Red I transferable, on contact therewith, to the surface of sausage emulsion encased therein whereby to uniformly and completely color the surface of said sausage emulsion.

6. Sausage casing comprising a film of regenerated cellulose plasticized with glycerine and uniformly and completely colored with at least one edible water soluble coal tar dye transferable, on contact therewith, to the surface of a sausage emulsion in contact therewith, whereby to completely and uniformly color the entire surface of said sausage emulsion.

7. The method of artificially coloring the surface of sausage emulsion which comprises stuffing the same into a sausage casing treated with a soluble edible coloring material transferable, on contact therewith, to the surface of the sausage emulsion whereby to uniformly color the entire surface of said sausage emulsion.

8. Sausage casing comprising a tube of regenerated cellulose at least substantially completely and uniformly treated with FD & C Red II transferable, on contact therewith, to the surface of sausage emulsion encased therein, whereby to uniformly and completely color the surface of said sausage emulsion.

9. Sausage casing comprising regenerated cellulose film plasticized with a polyhydric alcohol and uniformly and completely treated with at least one edible water soluble coal tar dye transferable, on contact therewith, to the surface of sausage emulsion encased therein, whereby to uniformly and completely color the surface of said sausage emulsion.

10. The method of making regenerated cellulose film sausage casing adapted to color sausage emulsion encased therein which comprises simultaneously plasticizing said sausage casing and treating the same with a coloring material in soluble form, transferable to the surface of said sausage emulsion.

11. The method of making regenerated cellulose film sausage casing adapted to color sausage emulsion encased therein which comprises passing said sausage casing through an aqueous solution of glycerine and an edible water soluble coal tar dye, said dye being transferable to said sausage emulsion on contact therewith.

ROBERT K. REMER.

REFERENCES CITED

The following references are of record in the file of this patent:

UNITED STATES PATENTS

| Number | Name | Date |
|---|---|---|
| 1,959,980 | Henderson et al. | May 22, 1934 |
| 2,301,564 | Menges | Nov. 10, 1942 |

FOREIGN PATENTS

| Number | Country | Date |
|---|---|---|
| 467,759 | Great Britain | June 23, 1937 |